Feb. 17, 1953    J. F. BORCHERS    2,628,729
DUMP BODY ATTACHMENT FOR GRAIN CONVEYERS
Filed March 15, 1949    2 SHEETS—SHEET 1
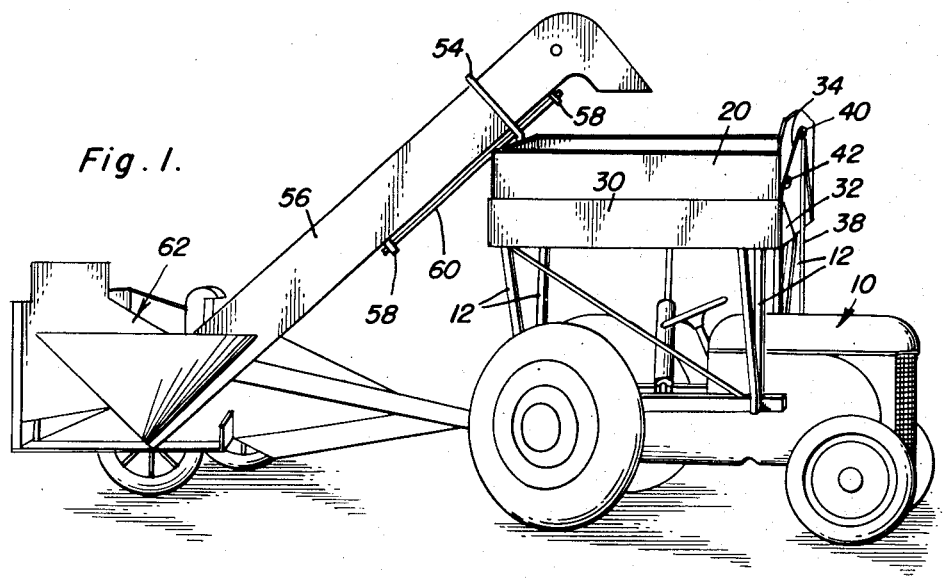
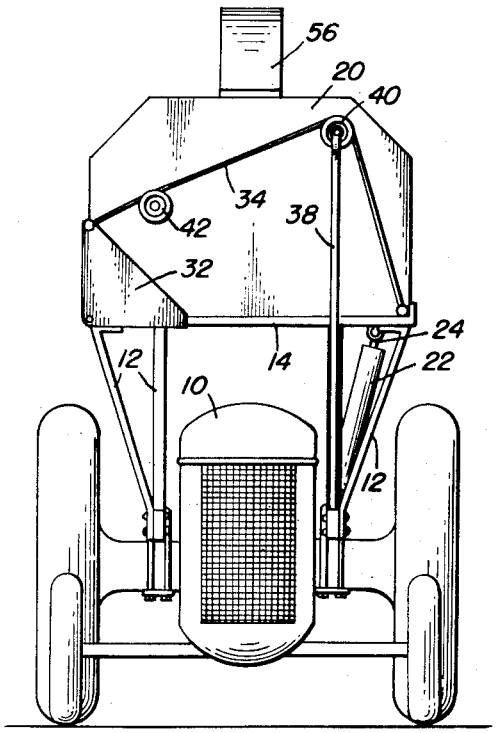
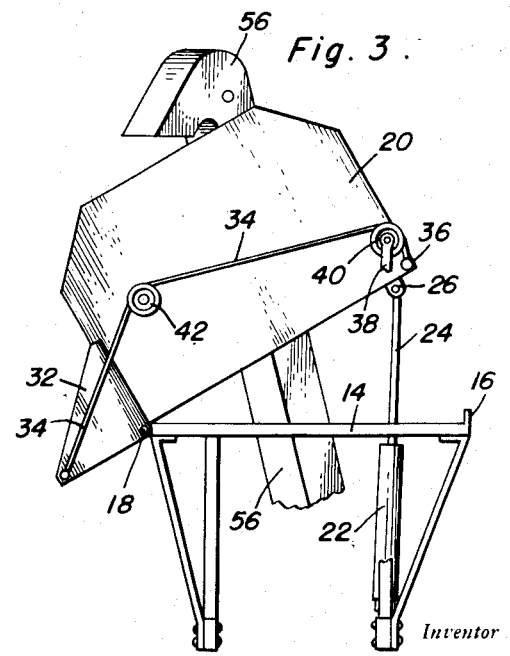
Inventor
John F. Borchers Feb. 17, 1953 J. F. BORCHERS 2,628,729
DUMP BODY ATTACHMENT FOR GRAIN CONVEYERS
Filed March 15, 1949 2 SHEETS—SHEET 2
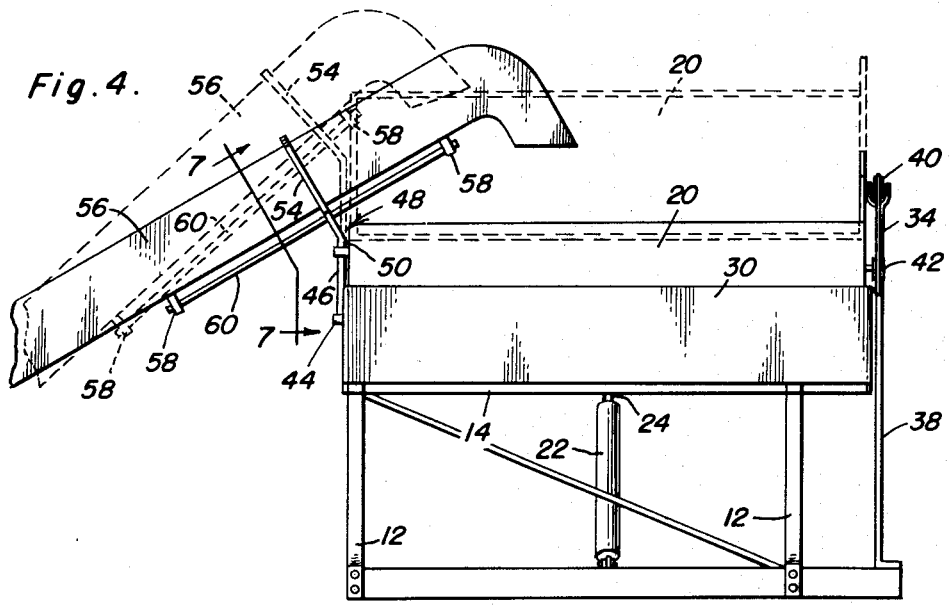
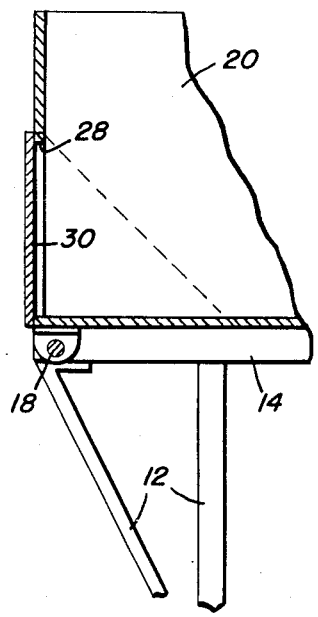
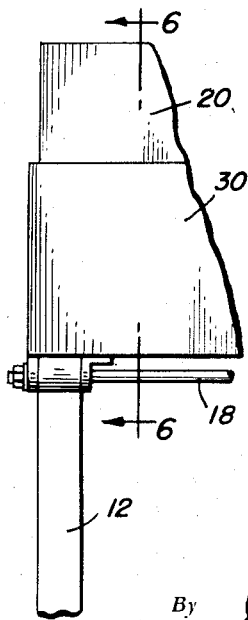
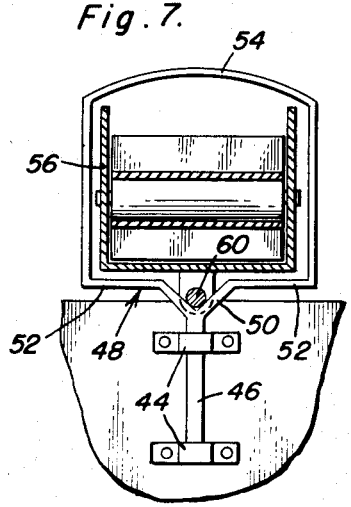
Inventor
John F. Borchers
By Clarence A. O'Brien
and Harvey B. Jacobson
Attorneys Patented Feb. 17, 1953

2,628,729

UNITED STATES PATENT OFFICE 2,628,729

DUMP BODY ATTACHMENT FOR GRAIN CONVEYERS

John F. Borchers, Henderson, Nebr., assignor of one-half to Harry Borchers, Henderson, Nebr.

Application March 15, 1949, Serial No. 81,428

6 Claims. (Cl. 214—42)

1

This invention relates to a support for the discharge end of a grain conveyor to retain it in operative relation with the body box of a dump body attachment for a farm tractor.

In the harvesting of a grain crop such as corn and the like wherein a corn picker is coupled to a conventional farm tractor to trail therebehind, it has been customary to employ an additional trailing vehicle which is coupled to the corn picker and into which the picked corn is deposited as the field is traversed. When light farm tractors are employed for such service, considerable difficulty is experienced owing to the fact that in soft ground the traction effort of the tractor is seriously impaired and the progress of the harvesting is retarded owing to the tremendous load which must be trailed behind the tractor. As a consequence body boxes into which the harvested grain is deposited have been mounted on the traction vehicle above the top thereof as exemplified in Patent 1,766,439 issued to G. W. Lang on June 24, 1930 and Patent 2,389,483, issued to H. Bobrowski et al. on November 20, 1945. When such body boxes are mounted on a tractor as suggested by the references above mentioned the question of the discharge of the contents of the body box during the progress of the harvesting becomes somewhat of a problem owing to the necessity of avoiding interference of the body box loading conveyor with the body box.

The primary object of this invention is to enable the contents of the body box to be discharged alongside of the tractor as the latter advances, and at the same time avoid interference with the grain conveyor when the body box is tilted to unloading position.

Another object is to retain the discharge end of the grain conveyor in proper relation with the body box irrespective of the movement of the latter from its normal horizontal position into its discharge position.

The above and other objects may be attained by employing this invention which embodies among its features a guide yoke mounted on one end of the body box which is mounted to tilt about a horizontal axis extending along one side thereof, said yoke being rotatable about an axis spaced from and which lies perpendicular to the horizontal axis about which the body box tilts, and a guide slidably mounted in said guide yoke and connected to a grain conveyor near the discharge end thereof to hold the discharge end of said conveyor over said body box.

Other features include a strap carried by the

2 yoke in encircling relation with the grain conveyor to assure the proper positioning of the grain conveyor with relation to the yoke, irrespective of the tilting of the body box.

In the drawings:

Figure 1 is a perspective view of a farm tractor showing the latter equipped with this improved tilting body box, and illustrating a conventional grain conveyor connected to the body box through which the harvested product is discharged into the body box;

Figure 2 is a front view in elevation of the device illustrated in Figure 1;

Figure 3 is a view similar to Figure 2 illustrating the body box tilted for discharging the contents thereof;

Figure 4 is a side view of the attachment;

Figure 5 is a fragmentary enlarged view illustrating in detail the pivotal support for the body box and the door thereof;

Figure 6 is a sectional view taken substantially along the line 6—6 of Figure 5; and, Figure 7 is a sectional view taken substantially along the line 7—7 of Figure 4.

Referring to the drawings in detail a conventional farm tractor designated generally 10 has attached thereto in any conventional manner suitable uprights 12 which support at their upper ends a horizontal frame 14 carrying along one side an upwardly extending flange 16 and supporting at its opposite side a pivot bar 18. A body box 20 is pivotally supported on the pivot bar 18 to tilt in a vertical arc from a horizontal position on the frame 14 to an inclined position as illustrated in Figure 3. A conventional hydraulic cylinder 22 is carried by the frame of the tractor 10, and the piston rod 24 of said cylinder 22 is pivotally coupled as at 26 to the underside of the body box 20 remote from the pivot bar 18. This cylinder 22 is connected in any suitable manner through suitable control valves carried by the tractor to a hydraulic system with which the tractor is conventionally equipped, so that upon manipulation of the valves, the piston rod 24 may be raised or lowered so as to tilt the body box 20 about the axis of the shaft 18 and discharge the contents of the box to one side of the tractor. The body box 20 is provided in the side wall thereof adjacent the pivot shaft 18 with a discharge opening 28 as will be readily understood upon reference to Figure 6.

Pivotally supported on the pivot shaft 18 for pivotal movement independently of the body box 20 is a door 30 which carries at opposite ends a pair of angular extensions 32 which overlie opposite end walls of the body box 20 and when the door is in open position serve as guides for the grain being discharged from the body box. Connected to one end of the door 30 adjacent the edge thereof remote from the pivot bar 18 one end of a cable 34, and the opposite end of this cable is coupled as at 36 to an adjacent end of the body box 20 adjacent the side edge thereof remote from the pivot bar 18. A suitable standard 38 is carried by the tractor 10 and projects upwardly therefrom, and rotatably supported at the upper end of the standard is a guide pulley 40 over which the cable 34 is trained, a similar guide pulley 42 is fixed to the end of the body box 20 adjacent the standard 38 and serves as a guide for the cable 34 so that as the body box tilts about the axis of the pivot shaft 18, the door 30 will move into open position as suggested in Figure 3.

Carried on the end wall of the body box 20 remote from the end carrying the pulley 42 is a pair of vertically spaced brackets 44 in which is rotatably supported a shank 46 of a guide yoke designated generally 48. This guide yoke comprises a substantially V-shaped body 50 having outwardly extending arms 52 to the outer ends of which are fixed opposite ends of a retaining strap 54 which is illustrated in the drawings and circles a conventional grain conveyor 56, adjacent the discharge end thereof. Supported in suitable brackets 58 carried by the grain conveyor 56 adjacent the discharge end thereof is a longitudinally extending guide bar 60 which as illustrated in Figure 7 is received in the crotch of the yoke 50, slidably to support the discharge end of the conveyor 56 with relation to the body box 20.

In use with the body box 20 mounted on the tractor 10 as illustrated in the drawings, the corn picker designated generally 62 is coupled in a conventional manner to the tractor 10, and the conveyor 56 of the corn picker is equipped with the guide bar 60 with the discharge end of the conveyor passing through the loop 54 and disposed above the body box 20, so that as the corn is harvested, the ears will be discharged through the conveyor 56 and the discharge end thereof into the body box. As the harvesting progresses and the body box becomes loaded with the picked corn, it will be evident that the traction on the traction wheels of the farm tractor 10 will be increased. When it is desired to discharge the contents of the body box, a suitable vehicle may be brought alongside of the farm tractor 10, and upon manipulating the hydraulic control valves, the hydraulic fluid may be admitted to the cylinder 22 to cause the piston rod to elevate the body box 20 as suggested in Figure 3 so as to tilt it about the pivot shaft 18. Simultaneously with the lifting of the side of the body box remote from the pivot shaft 18, the cable 34 will move across the guide pulleys 40 and 42 so as to drop the door 30 into open position. This will enable the contents of the body box to be discharged through the door and into the vehicle which has been brought alongside of the tractor, and when the contents of the body box has been completely discharged, the valves in the hydraulic system are again manipulated to exhaust the fluid from the cylinder 22 and permit the piston rod 24 to return to its initial position, thus restoring the body box to its horizontal position on the frame 14. Simultaneously with this movement, the door 30 will be moved into closed position with relation to the discharge opening 28 and the box is ready for refilling. With the tilting of the body box about the axis of the pivot shaft 18, the yoke 50 will slide along the guide bar 60 as suggested by the dotted lines in Figure 4, and simultaneously the lateral movement of the conveyor 56 will be accommodated by the turning of the yoke about the axis of the spindle 46, and the turning of the spindle within the brackets 44. In this way the discharge end of the grain conveyor 56 can be made to follow the movements of the body box 20 so that said discharge end will remain at all times in discharging position with relation to the body box, and even though the contents of the box is being discharged, the harvesting operation may progress without loss of the product.

While in the foregoing there has been shown and described the preferred embodiment of this invention, it is to be understood that minor changes in the details of construction and changes in the details of construction and arrangement of parts may be resorted to without departing from the spirit and scope of the invention as claimed.

Having described the invention, what is claimed as new is:

1. In a dump body attachment for a farm tractor, said attachment being of the type comprising a body box pivotally supported on a tractor above the top thereof to tilt about a horizontal axis adjacent one side of the tractor, means carried by the tractor and connected to the body box to tilt said box about said axle, means to support the discharge end of a grain conveyor in operative relation with said body box comprising a guide yoke mounted on one end of the body box to rotate above said body box about a normally vertical axis which is spaced from the horizontal axis and a guide slidably mounted in said guide yoke and connected to a grain conveyor near the discharge end thereof to hold the discharge end of said conveyor over said body box.

2. In a dump body attachment for a farm tractor, said attachment being of the type comprising a body box pivotally supported on a tractor above the top thereof to tilt about a horizontal axis adjacent one side of the tractor, means to support the discharge end of a grain conveyor in operative relation with said body box comprising a guide yoke mounted on one end of the body box to rotate above said body box about a normally vertical axis which is spaced from the horizontal axis and a guide slidably mounted in said guide yoke and connected to a grain conveyor near the discharge end thereof to hold the discharge end of said conveyor over said body box and a strap carried by the yoke in encircling relation to the grain conveyor.

3. In a dump body attachment, the improvement comprising a side dumping body box, said box rotating about a lower lateral edge thereof, a guide yoke journaled on one end of the body box to rotate above said body box about a normally vertical axis located intermediate the sides of said body box, a grain conveyor extending over the end of the body box, a guide secured to said grain conveyor adjacent the discharge end thereof, said guide being slidably mounted on said guide yoke to maintain the discharge end of said conveyor over said body box.

4. In a dump body attachment the improvement comprising: a side dumping body box, said body box being pivoted about a longitudinally extending substantially horizontal axis, a guide yoke pivotally mounted on one end of the body box to rotate above said body box about a normally vertical axis which is spaced from the horizontal axis, a grain conveyor extending over the end of said body box, a guide bar mounted on said grain conveyor in spaced parallel relation thereto near the discharge end thereof, said guide bar being slidably received in said guide yoke to hold the discharge end of said conveyor over said body box, and a strap carried by the yoke in encircling relation to the grain conveyor.

5. In a dump body attachment the improvement comprising: a side dumping body box, said body box being pivoted about a longitudinally extending substantially horizontal axis, a guide yoke mounted on one end of the body box to rotate above said body box about a normally vertical axis which is spaced from the horizontal axis, a grain conveyor extending over the end of the body box, a guide slidably mounted in said guide yoke and connected to said grain conveyor near the discharge end thereof to hold the discharge end of said conveyor over said body box, and a strap carried by the yoke in encircling relation to the grain conveyor, said guide yoke being provided with a notch portion, said guide including a guide bar secured to said conveyor in spaced relation therefrom and adapted to be received in said notch portion for guided reciprocating movement.

6. A support for the discharge end of a conveyor to retain it in operative relation over the end of a side dumping body box, said support comprising mounting brackets secured to the end of the body box, a shank rotatably supported in said brackets, a V-shaped guide yoke on said shank and extending above the end of the body box, outwardly extending arms on said yoke, a retaining strap fixed on said arms, a conveyor extending over the end of the body box, said strap encircling said conveyor adjacent the discharge end thereof, a guide bar mounted on the conveyor adjacent the discharge end thereof, said guide bar being slidably received in said guide yoke.

JOHN F. BORCHERS.

REFERENCES CITED

The following references are of record in the file of this patent:

UNITED STATES PATENTS

| Number | Name | Date |
|---|---|---|
| 1,766,439 | Lang | June 24, 1930 |
| 2,343,153 | Miller | Feb. 24, 1944 |
| 2,389,483 | Bobrowski et al. | Nov. 20, 1945 |